Feb. 12, 1963 E. AHRENS ETAL 3,077,521

STEREOPHONIC MOVING MAGNET PHONOGRAPH PICKUP

Filed Nov. 6, 1958

United States Patent Office 3,077,521

Patented Feb. 12, 1963

3,077,521

STEREOPHONIC MOVING MAGNET PHONOGRAPH PICKUP

Erhard Ahrens, Kiel, Schleswig-Holstein, Hans-Robert Kühn, Kiel-Gaarden, Schleswig-Holstein, and Erhard Richter, Kiel, Schleswig-Holstein, Germany, assignors, by mesne assignments, to Shure Brothers, Incorporated, a corporation of Illinois Filed Nov. 6, 1958, Ser. No. 772,283
Claims priority, application Germany Mar. 6, 1958
18 Claims. (Cl. 179—100.41)

Our invention relates to an electromagnetic phonograph pickup for stereophonic grooved records whose two sound tracks are located on the respective opposite side walls of a single groove. More particularly, the invention concerns a stereophonic pickup in which the respective recordings of the two tracks are reproduced with the aid of two induction coils which produce respective output voltages in response to the vibratory motion of a single stylus in two planes intersecting each other at an angle of approximately 90° and inclined about 45° to the surface plane of the record disc.

It is known to use electromagnetic groove cutting devices for producing the above-mentioned twin-track grooves on a record disc. One of these known devices (British Patent 394,325, FIG. 9) comprises a magnetic circuit in form of a triangular yoke placed upon one of its corners, the lowermost corner portion being open to form an air gap. Each of the two upwardly extending limbs of this magnetic circuit carries a main winding and an auxiliary winding. A movable armature of magnetically conducting material which carries the cutting stylus is located in the gap between the pole ends of the two limbs and is displaceable in the longitudinal direction of both limbs. The main coil on one of the respective limbs and the auxiliary coil on the other limb are electrically connected in series to form part of the two component cutting systems. Since the coils of both component systems are thus inductively coupled with one and the same magnetic circuit, the channel separation or decoupling of the two cutter control systems is far from satisfactory.

It is an object of our invention to devise a magnetic pickup for stereophonic sound records that affords a greatly improved separation between the respective reproductions of the two sound tracks than could be obtained with a reproducing pickup based upon the above-mentioned design principles of the known record cutting device. Another object of our invention, conjointly with the foregoing, is to reduce the oscillating mass of the stylus assembly and to greatly minimize its detrimental effects upon the quality of reproduction. Still another object in conjunction with those aforementioned is to devise a stereophonic pickup of the magnetic type in which the oscillating stylus assembly as a whole can be removed or inserted with particular ease for replacement purposes.

According to one of the features of our invention, the pickup comprises two mutually independent magnetic circuits each having a yoke with two pole portions spaced from each other in a direction that extends at an angle of approximately 90° to the spacing direction of the other two pole portions so as to jointly form a four-pole gap space. The spacing direction of a pair of pole pieces or pole portions is the direction of a line perpendicular to a plane between the pole portions, which plane is so located that if a magnet was moved in or parallel to the plane there would be substantially no magnetic change in the yoke or no response in the electric channel circuit associated therewith. The induction coils of the two electric channel circuits are mounted on the respective yokes and electrically separate from each other thus providing for a satisfactory separation between the two channels. The stylus assembly of the pickup is provided with an elongated stylus arm and has an elongated and longitudinally magnetized permanent magnet firmly joined with the arm in coaxial relation thereto. The stylus tip of the assembly is rigidly mounted on the end of the arm remote from the magnet. Furthermore, the above-mentioned stylus assembly as a unit is exchangeably seated in the gap space between the four pole portions in coaxial relation to that space, relative to which the assembly unit is slidingly removable and insertable in the axial direction. The stylus arm together with the attached magnet and the stylus tip are angularly displaceable about a pivot location within the gap space and preferably coincident or nearly coincident with the gravity center of the stylus unit. As a result, any detrimental effect of the entire oscillating mass upon the response to the sound tracks, can be kept extremely slight and the entire oscillating portion of the pickup, including the stylus and the magnet, can easily be exchanged for replacement purposes.

According to another feature of our invention, the exchangeable stylus assembly comprises a sleeve which is stuck into the gap space between the pole portions of the magnetic circuits and within which the stylus arm with the attached magnet is pivotally displaceable as described above. The sleeve is preferably given a portion whose cross section corresponds to that of the gap space so that this sleeve portion is frictionally held between the pole portions. The stylus arm and magnet are preferably mounted within the just-mentioned sleeve portion by means of a spacer of elastic material such as a ring of rubber which normally holds the magnet at equal spacing from the peripheral wall of the sleeve.

According to a further feature of our invention the sleeve, partly seated in the gap space, has a top portion extending from the seated portion along the stylus arm and above the stylus tip, and the sleeve has an opening, or is entirely open beneath the top portion, so that the stylus tip protrudes downwardly for free movement in response to the undulations of the sound tracks. As a result, the stylus arm and the appertaining parts of the oscillating assembly are protected from abuse or damage on the top as well as on both sides. However, the stylus can yieldingly move into the sleeve if it is ever placed too forcefully onto the record disc. Hence, only the protective sleeve but not the stylus can be subjected to impact in the event the tone arm carrying the pickup drops onto the record disc.

According to further features of the invention, the proper and permanent mounting of the two magnetic circuit devices in correct position is improved by embedding the magnetic yokes and the appertaining coils within a body of casting resin. It is further preferable to provide a metallic shield between the two magnetic circuits. The shield consists preferably of magnetically conducting material such as available commercially under the trade name Mumetal, to prevent magnetic as well as electric interaction between the two magnetic circuits. The metallic shield can likewise be embedded in the above-mentioned body of casting resin in order to be rigidly secured in proper position.

The invention will be further described with reference to the embodiment of a stereophonic pickup according to the invention illustrated by way of example on the accompanying drawings in which.

Figures 1, 6:
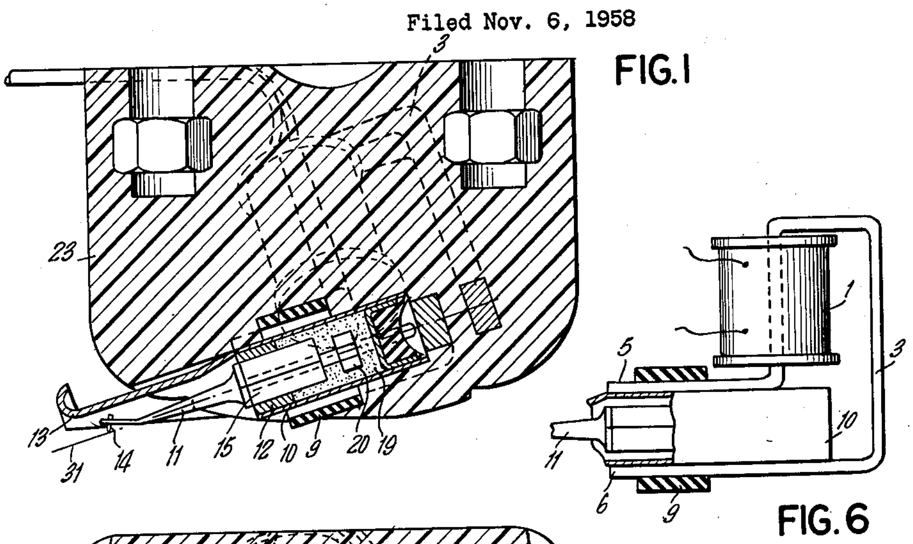
FIG. 1 is a vertical longitudinal section of the pickup with two induction coils.
FIG. 6 shows schematically one of the two magnetic yokes of the pickup according to FIGS. 1 and 2.

All illustrations are on enlarged scale.

The illustrated stereo pickup is provided with two inductively independent magnetic circuits formed by respective yokes 3 and 4 of which each carries an induction coil 1 or 2. Each yoke is formed of a strip of magnetizable material and has the shape apparent for yoke 3 in FIG. 6. The planes of the two yokes and hence the respective longitudinal axes of coils 1 and 2 are perpendicular to each other (FIG. 2) and, in the illustrated operative condition of the pickup, intersect the horizontal plane of the record surface at an angle of about 45°. The two yokes 3 and 4 and the appertaining induction coils 1, 2 are completely embedded in a body 24 of casting resin which forms a protective enclosure and also secures the parts and rigid position relative to each other. While the planes of the two yokes in the illustrated embodiment intersect each other at an angle of 90°, a somewhat different angle may be provided. For example, we found a slightly larger angle of about 100° preferable in some cases.

Figure 2:
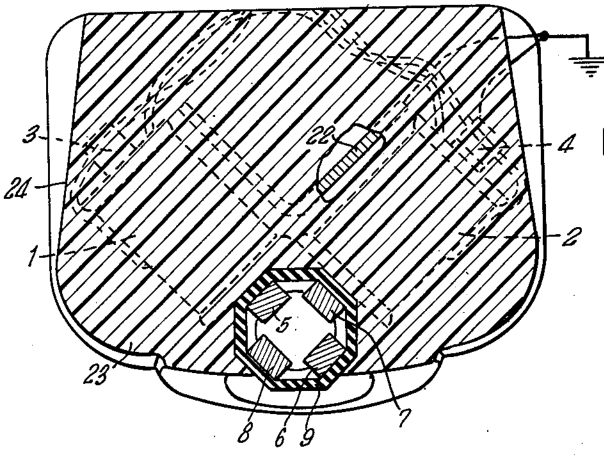
FIG. 2 is a cross section of the same pickup parallel to the plane defined by the respective longitudinal axes of the two coils.
Figure 3:
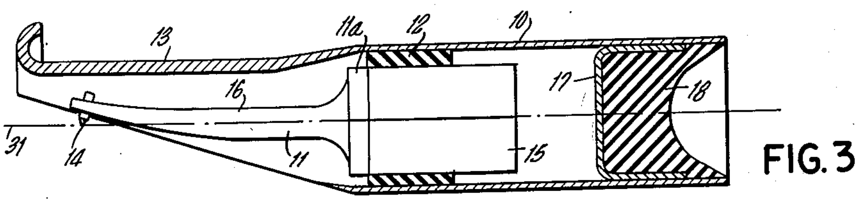
FIG. 3 is a longitudinal vertical section of an exchangeable stylus assembly applicable for the pickup.

The yoke 3 has two elongated pole pieces 5 and 6 which extend in parallel opposite each other and are spaced from each other in the plane of the loop-shaped yoke structure (FIG. 6). The yoke 4, having the same shape, has two pole pieces 7 and 8 also extending parallel to each other and mutually spaced in the plane of the correlated loop structure (FIG. 2). The four pole pieces are arranged symmetrically about the point of intersection of the two coil axes and jointly define a gap space of generally square cross section and axially elongated shape, so that the gap space has the shape of a prism placed on edge (FIG. 2). The longitudinal axis 31 (FIG. 1) of the gap space is slightly inclined to the horizontal. The free ends of the pole pieces are surrounded by a rubber ring 9. Stuck into the gap space and frictionally held therein is a protective sleeve 10 of nonmagnetic material whose cross section is likewise generally of square shape. The sleeve 10 forms part of the exchangeable stylus assembly and will be described more in detail with reference to FIGS. 3 to 5.

Mounted in the sleeve 10 of the stylus assembly is a stylus unit consisting of three firmly interconnected parts, namely a stylus arm 11, an elongated permanent magnet 15 of square cross section rigidly cemented to a flange **11*a* at one end of arm 11, and a stylus 14 rigidly mounted on the opposite end of arm 11 and consisting, for instance, of sapphire or diamond. The stylus unit is mounted in sleeve 10 by means of a rubber ring 12 located between magnet 15 and sleeve 10. The ring permits angular deflection of the stylus unit about a pivot point located between the pole pieces of the two yokes and substantially coincident with the center of gravity of the unit. The arm 11** consists preferably of light metal such as aluminum.

The portion of sleeve 10 adjacent to the arm 16 and the stylus 14 forms a protective cover 13 which is downwardly open so that the stylus 14 can enter into engagement with the sound-track groove of the record carrier. The stylus 14 protrudes downwardly beneath the lower edge of the protective cover 13 only to such an extent that it can yield behind the lower edge when the pickup or tone arm is dropped onto the record or otherwise subjected to excessive contact pressure. The front end of the cover 13 is bent upwardly in order to facilitate gripping the sleeve by hand when sticking the sleeve into the gap space or pulling it out.

Figure 5:
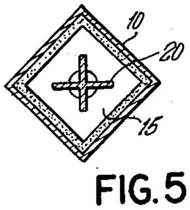
FIG. 5 is a vertical cross section along the line A—B in FIG. 4.
Figure 4:
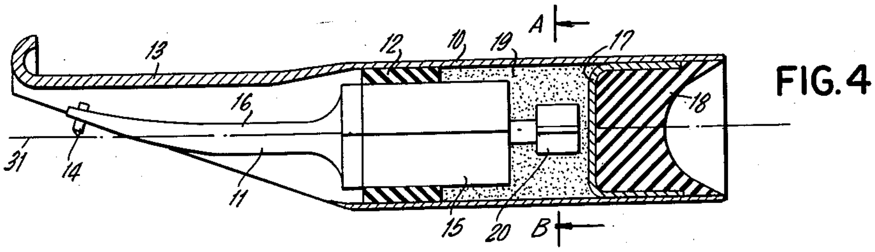
FIG. 4 is a longitudinal vertical section of a modified form of such a stylus assembly.

The rear end of sleeve 10 is sealed by means of a cup 17 and is additionally insulated and secured in position by means of a dab 18 of paint or varnish. The hollow space between rubber ring 12 and cup 17 may be filled with a fluid damping material such as silicon paste (FIGS. 1, 4) for the purpose of damping mechanical resonance. For increasing the damping effect, the rear end of the magnet may be provided with damping vanes 20 (FIGS. 1, 4, 5).

For securely preventing one magnetic circuit from magnetically and electrically influencing the other, an angular shield member 22 of sheet metal, preferably of a magnetically conducting metal such as available under the trade name Mumetal, is located between the two yokes and the respective induction coils mounted thereon. The shield 22 is connected by electric leads (FIG. 2) with the two yokes and is also grounded when in operation.

As mentioned, the housing 24 (FIG. 2) of the pickup is filled with casting resin 23 so that all parts of the magnet systems in the housing, including the shield 22 are firmly held in position. When casting the resin into the housing, the sleeve 10 with the entire stylus unit is preferably removed from the gap space and is temporarily substituted by a plug of the same shape and size which is subsequently removed after hardening of the resin. The recess thus molded into the body of casting resin is thereafter available for snugly receiving the protective sleeve 10 with the stylus system.

By virtue of the particular orientation of the pole pieces, the above-described pickup is designed for the reproduction of stereo sound recordings in which each lateral wall of a single groove is provided with one of the two undulatory sound tracks. The walls of such a groove intersect the horizontal surface plane of the record carrier at an angle of approximately 45° and thus extend parallel to the axes of the respective induction coils 1 and 2 or the respective planes of the two yokes 3 and 4. As a result, a deflection of the stylus tip 14 in the direction upwardly to the right, for example, causes an essentially change of flux in the magnetic circuit of yoke 4 but no appreciable change of flux in the magnetic circuit of yoke 3, whereas a deflection of the stylus tip 14 in the direction upwardly to the left causes a flux change in yoke 3, without appreciably affecting the flux in yoke 4. Consequently any possible deflection of the stylus tip caused by the sound tracks produces a greater or lesser change or flux in the two magnetic circuits depending upon the components of motion correlated to the planes of the respective magnetic circuits. As a result, the voltages generated in the induction coils correspond to the respective sound recordings of the two tracks. In this respect the pickup according to the invention secures an optimum amount of cross-talk attenuation, i.e. a good separation between the two stereophonic channels.

It will be apparent to those skilled in the art, upon studying this disclosure, that pickups according to our invention can be modified with respect to details without departing from the essential features of the invention as set forth in the claims annexed hereto.

We claim:

1. A phonograph pickup cartridge comprising a cartridge body and a transducer system operatively mounted therein, said transducer system comprising a pair of electromagnets each comprised of a core terminating in a pair of spaced-apart pole pieces forming a gap therebetween and a coil arranged about said core, the orientation of said pole pieces being such that they form a common gap with the gap spacing directions of the respective pairs of pole pieces perpendicular to each other, said common gap forming an open-ended socket, and a subassembly frictionally and removably held in the socket, including a bearing of an elastomeric material having an axial aperture therein, an armature comprising a permanent magnet operatively supported in said aperture for angular vibration within said common gap, substantially about a point intermediate the poles of said magnet, the magnetic axis of said armature being oriented substantially perpendicular to the gap spacing directions of both of said pairs of pole pieces, and means including a stylus connected with said armature for transmitting vibrations thereto, said cartridge including means for insuring orientation of the stylus with respect to the pole pieces for stereophonic vibration of the armature by the stylus.

2. A pickup cartridge according to claim 1 wherein said pole pieces are embedded in a substantially rigid plastic block with a recess formed therein to snugly receive a portion of said subassembly, whereby said pole pieces and said subassembly are permanently maintained in proper orientation.

3. A phonograph pickup cartridge comprising a cartridge body and a transducer system operatively mounted therein, said transducer system comprising a pair of electromagnets each comprised of a core terminating in a pair of spaced-apart pole pieces forming a gap therebetween and a coil arranged about said core, the orientation of said pole pieces being such that they form a common gap with the gap spacing directions of the respective pairs of pole pieces perpendicular to each other, and an armature-stylus subassembly, said subassembly comprising a generally sheet-form supporting member having a sleeve at one end mounted within said common gap, a bearing of an elastomeric material having an axially positioned aperture forming a socket fixedly mounted within said sleeve, an armature comprising a permanent magnet operatively mounted in said socket for angular vibration within said common gap substantially about a point intermediate the poles of said magnet, the magnetic axis of said armature being oriented substantially perpendicular to the spacing direction of said pairs of pole pieces, and a stylus affixed to said armature for transmitting vibration thereto, whereby said subassembly is removable by grasping said supporting member and retracting said subassembly axially.

4. A phonograph pickup cartridge according to claim 3 wherein the cross-sectional configuration of said socket is substantially the same as that of said armature.

5. A phonograph pickup cartridge according to claim 3 wherein the electromagnets are shielded by a magnetic shield.

6. In a pickup according to claim 3, said two cores forming respective loop structures extending in respective planes of angular relation to each other, and a grounding shield member of magnetically conducting metal mounted between said two cores for preventing magnetic and electric interaction of said two electromagnets, said shield member having angular shape and having two angle-leg portions substantially parallel to said respective two planes.

7. An armature-stylus subassembly for a magnetic pickup cartridge comprised of two electromagnet systems each terminating in a pair of spaced-apart pole pieces arranged to describe a common magnetic gap and to form a socket having a recess substantially co-extensive with said gap; said subassembly comprising a supporting member, a bearing of an elastomeric material having a channel therein retained within said supporting member, an armature comprising a permanent magnet operatively mounted in said bearing channel for angular vibration substantially about a point intermediate the poles of said magnet, and means including a stylus connected with said armature for transmitting vibrations thereto, the portion of said supporting member containing said armature and said bearing being contoured so that it may be inserted axially into the recess of said socket at said common gap and, when so inserted, orients and retains said armature within said gap in operating position.

8. An armature-stylus subassembly according to claim 7 in which said support member has an enclosed hollow space axially behind said magnet, a damper vane mounted on said magnet in said space, and pasty substance filling said space.

9. An armaure-stylus subassembly according to claim 7 in which said support member has a top portion extending along and over said stylus, and having an opening beneath said top portion, said stylus extending through said opening and out of said support member.

10. An armature-stylus subassembly for a magnetic pickup cartridge comprised of two electromagnetic systems each terminating in a pair of spaced-apart pole pieces arranged to describe a common magnetic gap and to form a socket having a recess substantially co-extensive with said gap, said subassembly comprising a supporting member, a bearing of an elastomeric material having a channel therein retained within said supporting member, an armature comprising a permanent magnet operatively mounted in said bearing channel for angular vibration substantially about a point intermediate the poles of said magnet, and means including a stylus connected with said armature for transmitting vibrations thereto, the portion of said supporting member containing said armature and said bearing being contoured so that it may be inserted axially into the recess of said socket at said common gap, and when so inserted, orients and retains said armature within said gap in operating position, the magnetic axis of said armature being parallel to the axis of the portion of said supporting member containing said armature.

11. An armature-stylus subassembly for a magnetic pickup cartridge comprised of two electromagnet systems each terminating in a pair of spaced-apart pole pieces arranged to describe a common magnetic gap and to form a socket having a recess substantially co-extensive with said gap, said subassembly comprising a generally sheet-form supporting member, a bearing of an elastomeric material having a channel therein retained within said supporting member, an armature comprising a permanent magnet operatively mounted in said bearing channel for angular vibration substantially about a point intermediate the poles of said magnet, and means including a stylus connected with said armature for transmitting vibrations thereto, the portion of said supporting member containing said armature and said bearing being contoured so that it may be inserted axially into the recess of said socket at said common gap and be frictionally retained therein, and, when so inserted, orients and retains said armature within said gap in operating position.

12. An armature-stylus subassembly for a magnetic pickup cartridge comprised of two electromagnet systems each terminating in a pair of spaced-apart pole pieces arranged to describe a common magnetic gap and to form a socket having a recess substantially co-extensive with said gap, said subassembly comprising a supporting member having a tubular portion, a bearing of an elastomeric material having a channel therein retained within the tubular portion of said supporting member, an armature comprising a permanent magnet operatively mounted in said bearing channel for angular vibration substantially about a point intermediate the poles of said magnet, and means including a stylus connected with said armature for transmitting vibrations thereto, the tubular portion of said supporting member being contoured so that it may be inserted axially into the recess of said socket at said common gap, and, when so inserted, orients and retains said armature within said gap in operating position.

13. A subassembly according to claim 12 wherein the tubular portion of said supporting member has a square cross-sectional configuration.

14. A phonograph pickup cartridge comprising a cartridge body and a transducer system operatively mounted therein, said transducer system comprising a pair of electromagnets each comprised of a core terminating in a pair of spaced-apart pole pieces forming a gap therebetween and a coil arranged about said core, the orientation of said pole pieces being such that they form a common gap with the gap spacing directions of the respective pairs of pole pieces perpendicular to each other, and an armature-stylus subassembly removably positioned in said gap, said subassembly comprising a supporting member having a thin-walled sleeve at one end mounted within said common gap, said sleeve having a snug friction fit with said pole pieces, a bearing of an elastomeric material having an axially positioned aperture fixedly mounted within said ferrule, an armature comprising a permanent magnet operatively mounted in said aperture for angular vibration within said common gap substantially about a point within said magnet, the magnetic axis of said armature being oriented substantially perpendicular to the gap spacing directions of said pairs of pole pieces, and a stylus affixed to said armature for transmitting vibration thereto.

15. An armature-stylus subassembly for a magnetic pickup cartridge comprised of two electromagnetic systems each terminating in a pair of spaced-apart pole pieces arranged to describe a common magnetic gap and to form a socket having a recess substantially co-extensive with said gap; said subassembly having an elongated slim body portion adapted to be thrust end first fully into said socket and to have a snug friction fit therein, said subassembly having four flat sides defining a square cross-section, a slim elongated permanent magnet, having poles at opposite ends, positioned within and along the axis of the body, and an elastomeric bearing engaging the permanent magnet substantially around its mid portion, and leaving its ends free for universal pivoting of the permanent magnet about a point between its poles to cause its opposite poles to approach close to opposite flat sides of the body, and means connected to the permanent magnet through the end of the body and including a stylus extending laterally of the axis of the body in a plane diagonally disposed with respect to the square cross-section.

16. Electromagnetic phonograph pickup for stereophonic grooved records, comprising two mutually independent magnetic circuits each having a yoke with two pole portions spaced from each other in a direction intersecting the spacing direction of the other two pole portions and forming together therewith a four-pole gap space, induction coils mounted on said respective yokes, a stylus assembly having an elongated stylus arm and an elongated and longitudinally magnetized permanent magnet firmly and coaxially joined with each other with the arm extending from an end of said magnet and having a stylus tip on said arm remote from said magnet, said assembly as a whole being exchangeably seated in said gap space in coaxial relation thereto and being slidingly removable and insertable in the axial direction, said magnet being resiliently mounted in an elastomeric bearing member for deflection in angular relation to the gap-space axis about a predetermined pivot point within said gap space and within said magnet, said two pole portions of each of said yokes extending straight along the entire of said magnet.

17. Electromagnetic phonograph pickup for stereophonic records, comprising two mutually independent magnetic circuits each having a yoke with two pole portions spaced from each other in a direction intersecting the spacing direction of the other two pole portions and forming together therewith a four-pole gap space, induction coils mounted on said respective yokes, a stylus assembly having an elongated stylus arm and an elongated and longitudinally magnetized permanent magnet firmly joined with each other in coaxial relation and having a stylus tip on said arm remote from said magnet, said stylus assembly comprising a non-magnetic sleeve surrounding said magnet, and spacer means of resilient material disposed between said magnet and said sleeve and holding said magnet spaced from the sleeve perimeter in coaxial relation thereto, said magnet and arm being angularly deflectable relative to said sleeve, said sleeve being exchangeably seated in said gap space in coaxial relation thereto whereby said stylus assembly is removable and insertable into said gap space in the axial direction thereof, said sleeve having a top portion extending along said arm and over said stylus tip, and having an opening beneath said top portion, said stylus tip extending through said opening out of said sleeve.

18. Electromagnetic phonograph pickup for stereophonic records, comprising two mutually independent magnetic circuits each having a yoke with two pole portions spaced from each other in a direction intersecting the spacing direction of the other two pole portions and forming together therewith a four-pole gap space, induction coils mounted on said respective yokes, a stylus assembly having an elongated stylus arm and an elongated and longitudinally magnetized permanent magnet firmly joined with each other in coaxial relation and having a stylus tip on said arm remote from said magnet, said stylus assembly comprising a non-magnetic sleeve surrounding said magnet, and spacer means of resilient material disposed between said magnet and said sleeve and holding said magnet spaced from the sleeve perimeter in coaxial relaton thereto, said magnet and arm being angularly deflectable relative to said sleeve, said sleeve being exchangeably seated in said gap space in coaxial relation thereto whereby said stylus assembly is removable and insertable into said gap space in the axial direction thereof, said sleeve having an enclosed hollow space axially behind said magnet, a damper vane mounted on said magnet in said space, and pasty substance filling said space.

References Cited in the file of this patent

UNITED STATES PATENTS

| | | |
|---|---|---|
| 2,864,897 | Kaar | Dec. 16, 1958 |
| 2,820,853 | Dally | Jan. 21, 1958 |
| 2,875,282 | Reiback | Feb. 24, 1959 |

FOREIGN PATENTS

| | | |
|---|---|---|
| 336,648 | Great Britain | Oct. 15, 1930 |

UNITED STATES PATENT OFFICE

CERTIFICATE OF CORRECTION

Patent No. 3,077,521 February 12, 1963

Erhard Ahrens et al.

It is hereby certified that error appears in the above numbered patent requiring correction and that the said Letters Patent should read as corrected below.

Column 7, line 56, after "entire" insert -- length --.

Signed and sealed this 3rd day of September 1963.

(SEAL)
Attest:

ERNEST W. SWIDER
Attesting Officer

DAVID L. LADD
Commissioner of Patents